(12) United States Patent
Stiesdal

(10) Patent No.: US 8,807,937 B2
(45) Date of Patent: Aug. 19, 2014

(54) WIND TURBINE

(75) Inventor: Henrik Stiesdal, Odense C (DK)

(73) Assignee: Siemens Aktiengesellschaft, Munich (DE)

( * ) Notice: Subject to any disclaimer, the term of this patent is extended or adjusted under 35 U.S.C. 154(b) by 558 days.

(21) Appl. No.: 13/086,460

(22) Filed: Apr. 14, 2011

(65) Prior Publication Data

US 2011/0280722 A1    Nov. 17, 2011

(30) Foreign Application Priority Data

May 12, 2010   (EP) ..................................... 10162687

(51) Int. Cl.
*F03D 7/02*    (2006.01)
(52) U.S. Cl.
USPC .............................................. 416/1; 416/147
(58) Field of Classification Search
None
See application file for complete search history.

(56) References Cited

U.S. PATENT DOCUMENTS

| | | | |
|---|---|---|---|
| 4,160,170 A | 7/1979 | Kos | |
| 7,121,795 B2 * | 10/2006 | Moroz et al. | 416/1 |
| 7,452,185 B2 | 11/2008 | Ide et al. | |
| 2006/0002797 A1 | 1/2006 | Pierce | |
| 2007/0057517 A1 | 3/2007 | McNerney | |
| 2009/0108582 A1 * | 4/2009 | Seibers et al. | 290/44 |
| 2010/0014971 A1 | 1/2010 | Carl | |

FOREIGN PATENT DOCUMENTS

| | | |
|---|---|---|
| CN | 101424248 A | 5/2009 |
| EP | 1612414 A2 | 1/2006 |
| GB | 2023237 A | 12/1979 |
| WO | WO 2008043762 A1 | 4/2008 |
| WO | WO 2008081232 A1 | 7/2008 |
| WO | WO 2008119351 A2 | 10/2008 |
| WO | WO 2009033484 A2 | 3/2009 |
| WO | WO 2009059606 A2 | 5/2009 |

* cited by examiner

*Primary Examiner* — Richard Edgar

(57) ABSTRACT

A wind turbine for power generation is provided. The wind turbine includes a power generating unit and a rotor having a plurality of blades. To control power output of the wind turbine, the blades are capable of being pitched by a blade pitch adjusting device. The wind turbine also includes a pitch control unit for controlling the blade pitch adjusting device. Furthermore, the wind turbine includes a load determining device for determining the blade load from the pitch activity of the blades.

19 Claims, 2 Drawing Sheets

Legend

4 - generator
7 - blade pitch adjusting means
9 - pitch control unit
10 - load determining means

WIND TURBINE

CROSS REFERENCE TO RELATED APPLICATIONS

This application claims priority of European Patent Office application No. 10162687.7 EP filed May 12, 2010, which is incorporated by reference herein in its entirety.

FIELD OF INVENTION

The invention relates to a wind turbine for power generation having a power generating unit and a rotor having a number of blades, whereby to control power output of the wind turbine the blades are capable of being pitched by means of a blade pitch adjusting means, and a pitch control unit for controlling the blade pitch adjusting means.

BACKGROUND OF INVENTION

Wind turbines are exposed to harsh climatic environments. They are oftentimes installed on sites with bad wind conditions having high medium wind speeds and high turbulence gusts. In these cases it might be necessary that the operation of a wind turbine has to be at least temporarily stopped or interrupted in order to avoid an overload of its components. In particular, the hydraulic controlled pitch system may be affected due to high oil temperatures and/or low hydraulic pressures caused by a high pitch activity under instantly changing climatic circumstances. However, interrupting the operation of a wind turbine is an expensive approach to solve this problem as only sparse electric power is produced.

US 2007/0057517 relates to a method for limiting loads in a wind turbine by using measured loads or wind speed to increase the minimum pitch angle for extended periods. The minimum pitch angle will be allowed to relax down to the default when load excursions diminish. The method will allow turbines to capture more energy by operating in higher wind speeds and/or utilizing larger rotors without additional loss of fatigue life. Yet, this method is not capable of detecting an overload of components of the wind turbine like the hydraulic pitch system for example due to a high pitch activity in rough climatic conditions.

U.S. Pat. No. 7,452,185 B2 discloses a blade pitch-angle control device including a memory unit in which predetermined parameters that affect the load fluctuation of blades, azimuth angles, and pitch-angle command values are stored in association with each other. An azimuth-angle detecting unit detects the azimuth-angle of each of the blades. A parameter-detecting unit detects the predetermined parameters. A command-value receiving unit receives pitch-angle command values for each of the blades from the memory unit. Thereby, the pitch-angle command values are being selected on the basis of the azimuth-angle of each blade detected by the azimuth-angle detecting unit and the predetermined parameters detected by the parameter-detecting unit. Further, a pitch-angle control command-value generating unit that generates pitch-angle controlled command-values for individually controlling the pitch-angle of each blade on the basis of the pitch-angle command-values and a common-pitch-angle command-value is provided. Still, a measure for avoiding the overload of components of the wind turbine due to a high pitch activity that is in harsh climatic conditions is not given.

SUMMARY OF INVENTION

Hence, it is an object of the invention to provide a wind turbine capable of avoiding overload situations of its components.

This is achieved by a wind turbine as described above, wherein a load determining means for determining the blade load from the pitch activity of the blades is provided.

The invention emanates from the idea to use the pitch activity as a proxy for the blade load, whereby the pitch activity may be calculated and/or measured using the load determining means which is capable of processing and analysing information provided by the pitch control unit controlling the blade pitch adjusting means i.e. the pitch of the blades. Hence, a correlation of the pitch activity and the current blade load is indirectly or directly established by the use of the load determining means. Therefore, the load determining means may incorporate at least one processing and/or calculating unit.

Thereby, generally high pitch activity indicates high blade loads and low pitch activity indicates comparatively small blade loads. In other words, if the blade pitch adjusting means instantly changes, that is adjusts the pitch-angle of the blades due to wind turbulences, gusts or abruptly changing wind speed and/or wind direction for example, whereby the blade pitch adjusting means is controlled by the pitch control unit, the load determining means deduces that the blades experience high loads.

The load determining means may use known pitch-related parameters containing information which establish a relation between the pitch activity and the blade load if need be. This relation may be in form of or supported by data from simulations and/or empirical values of former pitch activity or blade load measurements respectively.

In general, the term load refers to all kinds of load encountered by the blades and thus, embraces static and dynamic loads. As the pitch activity may be obtained separately for each of the blades, loads may be determined separately for each blade. Of course, an overall view, i.e. a cumulative determination of all blade loads is possible as well.

It is preferred, when the load determining means is adapted to determine the pitch activity from a pitch reference signal and/or the standard deviation of the pitch reference signal and/or the average pitch speed and/or the total pitch movement per time. In such a manner, all parameters being relevant for the operation of the wind turbine, which are or may be affected by the blade load are considered for determining the blade loads. Thereby, the pitch reference signal, the standard deviation of the pitch reference signal, the average pitch speed and the total pitch movement per time may be considered separately, group-wise or cumulatively. As an example, the pitch-angle and consequently the pitch reference signal may vary extensively in bad wind conditions, i.e. wind turbulences and gusts as the pitch control unit is constantly trying to optimise the power production of the wind turbine by constantly sending control-signals to the blade pitch adjusting means adjusting the blade pitch. This gives rise to a large standard deviation of the pitch reference signal indicating a large dynamic blade load.

It is of advantage, when the load determining means is adapted to receive and process input rotor speed signals from a rotor speed determining device and/or rotor reference speed signals from a rotor reference speed signal device. Consequently, the load determining means is capable of involving direct operation of parameters concerning rotor speed provided from a rotor speed signal device representing a part of the inventive wind turbine in line with the determination of the blade load. The same applies to the rotor reference speed signal which may additionally or alternatively be employed for determining the blade load on basis of the pitch activity. Both rotor speed signal and rotor speed reference signal are highly affected by the wind conditions. Consequently, they may be related to the pitch activity by the load determining means.

In a further embodiment of the invention, the load determining means is adapted to consider at least one external parameter and/or at least one internal parameter for the determination of the blade load. In such a manner, the number of possible input values or parameters on base of which the load determining means determines the pitch activity and the blade load respectively is increased, which allows a more precise determination of the blade load. The external and/or internal parameters might also be deemed as possible correction means while determining the blade loads.

Possible external parameters may be wind speed and/or ambient temperature and/or ambient pressure and/or air density. Therefore, the load determining means comprises at least one sensor or at least one sensor-array for measuring at least one of the mentioned parameters, which all affect in direct or indirect manner the pitch activity and the blade load respectively. Of course, other useful parameters may be considered in addition. In this context the incorporation of data concerning weather forecast or the like may be mentioned as well.

Possible internal parameters may be temperature and/or pressure of a hydraulic oil of the blade pitch adjusting means and/or generated power of the wind turbine. Hence, all operational parameters of the blade pitch adjusting means give at least an indirect indication on the pitch activity, therefore temperature and/or pressure of a hydraulic oil of the blade pitch adjusting means is preferably considered for the determination of the blade load. It is understood, that other working media for example when the blade pitch adjusting means uses any other working fluid than oil or is no hydraulic- but a pneumatic-based means incorporating a working gas instead of a working fluid may be accordingly considered. The generated power of the wind turbine may also allow indicating the blade load as abrupt jumps in the power generation may indicate the occurrence of gusts, that is generally high blade loads.

In a further preferred embodiment of the invention the load determining means is adapted to generate and output a power reference control signal to the power generating unit, whereby power generation is performed in dependence on the power reference control signal, and/or a pitch reference control signal to the pitch control unit, whereby pitching of the blades is performed in dependence on the pitch reference control signal. The load determining means may increase or decrease the power production of the wind turbine for instance by changing the reference point of the power curve of the generator. The power curve is provided for each type of wind turbine and commonly represents a definition of the power production of the wind turbine or the generator respectively as a function of wind speed. Usually, the power curve includes the rated power, which is the maximum operating power of the power generating unit, i.e. the generator and the wind speed at which the rated power is achieved. The same applies to the pitch reference signal as the load determining means is able to change the pitch-angle of the blades in dependency on a calculated and/or measured pitch activity. Thus, the load determining means may control essential features during the operation of the wind turbine under the premise of avoiding an overload of the blades or other components of the wind turbine.

As an example, during bad wind conditions the load determining means provide a power reference control signal to the power generating unit so as to lower the reference point of the power curve of the power generating unit. Consequently, interrupting the operation of the wind turbine is not necessary as merely the quantity of generated power is diminished. Additionally, the pitch-angle of the blades may be changed so that the force on the blades is reduced by means of the pitch reference control signal.

In favour, a memory unit is provided storing pitch activity data determined from the load determining means. In such a manner the incoming, outgoing or only temporarily processed data of the load determining means may be used in long tem control of the wind turbine. Thereby, the pitch activity may be used to control the wind turbine in terms of ensuring that in particular highly loaded components as the blades, the gear or the tower to name just a few are not overloaded in a long period of usage concerning the service life of these components.

Another aspect of the invention refers to a method for operating a wind turbine as described above, comprising: determining the pitch activity of the blades, determining the blade load of the blades from the pitch activity using the load determining means and controlling the power generating unit and/or the rotor speed in dependence on the blade load. The wind turbine, i.e. its power generating unit and/or rotor speed is essentially controlled with respect to the blade load. The initial step involves determining the pitch activity of the blades, which represents a gauge for the currently occurring blade load. Consequently, the load determining means determines the blade load from the pitch activity. At last, the power generating unit and/or the rotor speed is controlled in dependence on the blade load, whereby in cases of high blade loads the power generation and rotor speed both directly affecting each other are reduced. Inversely, that is in cases of comparatively low or normal blade loads the limitation of power generation of the wind turbine and the number of revolutions of the rotor respectively is abandoned.

It is preferred, when the pitch activity is determined from the pitch reference signal and/or the standard deviation of the pitch reference signal and/or the average pitch speed and/or the total pitch movement per time. As mentioned above, these parameters are useful in line with the determination of the pitch activity and the blade load respectively and according to this in regard to the operation of the wind turbine in general.

Favourably, the load determining means receives and processes input rotor speed signals from a rotor speed determining device and/or rotor reference speed signals from a rotor reference speed signal device. Regarding the control of the rotor speed, it is of advantage when all parameters concerning the rotation of the rotor, i.e. mainly rotor speed signals provided by a rotor speed determining device and containing information on the ongoing rotor speed and rotor reference signals provided by a rotor reference speed signal device and indicating a possible gradient between an instantaneous speed value and a nominal speed value are considered. Hence, the operation of the wind turbine may be controlled more precisely.

It is further preferred, that the load determining means considers at least one external parameter and/or at least one internal parameter for determining the blade load. These additional parameters may be used in terms of a correction or regulating means and provide further information value to the load determining means.

External parameters may be wind speed and/or ambient temperature and/or ambient pressure and/or air density for example. Internal parameters may be temperature and/or pressure of a hydraulic oil of the blade pitch adjusting means and/or generated power of the wind turbine for example. It is understood, that in cases of the wind turbine comprising a blade pitch adjusting means using a different working fluid than oil, all internal parameters relate to the according working fluid. Likewise, if the blade pitch adjusting means is a pneumatic apparatus, all internal parameters relate to the according working gas. As an example, in gusty environments high oil temperatures and/or corresponding low oil pressures may occur if need be in combination with high quantities of generated power, indicating that the wind turbine is in or close to an overload. Consequently, the reference point of the power curve of the generator is decreased and/or rotor speed is limited, that is operation of the wind turbine is temporarily below a possible maximum value regarding its power production which leads to a lower load of its components. Yet, stopping the operation of the wind turbine is not necessary.

In a further embodiment the load determining means generates and outputs a power reference control signal to the power generating unit, whereby power generation is performed in dependence on the power reference control signal, and/or a pitch reference control signal to the pitch control unit, whereby pitching of the blades is performed in dependence on the pitch reference control signal. Hence, essential factors of the operation of the wind turbine, that is the operation of the power generating unit and the blade pitch which strongly affects the rotational speed of the blades are controllable by the load determining means.

If the load determining means has determined the danger of a possible overload of one or more of its components signals concerning the operation of the power generating unit and/or the pitch control unit are generated and outputted on base of which the operation of these components is regulated so as to avoid or reduce the danger of an overload.

It is further advisable, when pitch activity data determined from the load determining means is stored in a memory unit. In such a manner, it is ensured that preferably all load situations of the wind turbine or any of its components having occurred during operation of the wind turbine are storable and may be evaluated in terms of service, i.e. maintenance and/or repair for instance.

BRIEF DESCRIPTION OF THE DRAWINGS

In the following the invention is described in detail as reference is made to the figures, whereby.

DETAILED DESCRIPTION OF INVENTION

Figure 1:
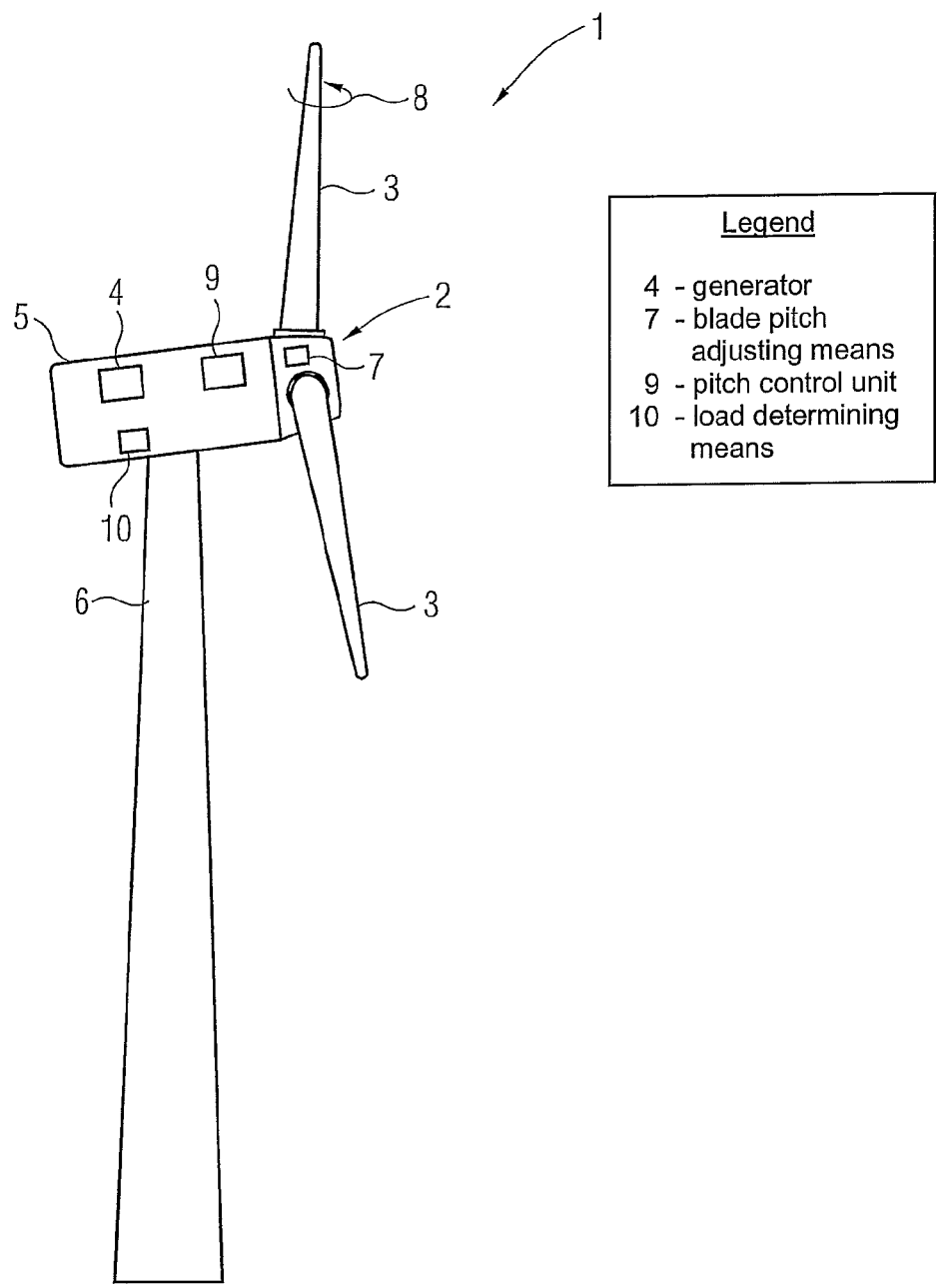
FIG. 1 depicts a schematic wind turbine according to an exemplary embodiment of the invention.

FIG. 1 shows a schematic view of a wind turbine 1 according to an exemplary embodiment of the invention. The wind turbine 1 is a direct-drive wind turbine having a reduced number of components as it particularly does not comprise a gear box. Direct-drive wind turbines have a direct mechanical coupling between the wind rotor hub 2 having a number of pitchable blades 3 attached to it and a power generating unit in form of a generator 4, so that the wind drives the blades 3 and the rotor within the generator 4 together as a unit.

The wind turbine 1 comprises a nacelle 5 being rotatably disposed on a tower 6. The nacelle 5 essentially accommodates all components of the wind turbine 1 which are relevant for the generation of power. Further, a hydraulic blade pitch adjusting means 7 which accomplishes pitching of the blades 3 in separate or cumulative manner is provided. The pitch of the blades 3 may vary between a low or highly energetic pitch-angle of 0°, whereby the blades 3 expose a large surface to the wind and a high or low energetic pitch-angle of 90°, whereby the blades 3 expose only little surface to the wind.

The possible pitch of the blades 3 is indicated by arrow 8, that is they essentially pitch around their longitudinal axis. A pitch control unit 9 for controlling the blade pitch adjusting means 7 as well as a load determining means 10 for determining the load of the blades 3 from the pitch activity of the blades 3, that is essentially a pitch reference signal are also disposed within the nacelle 5.

Figure 2:
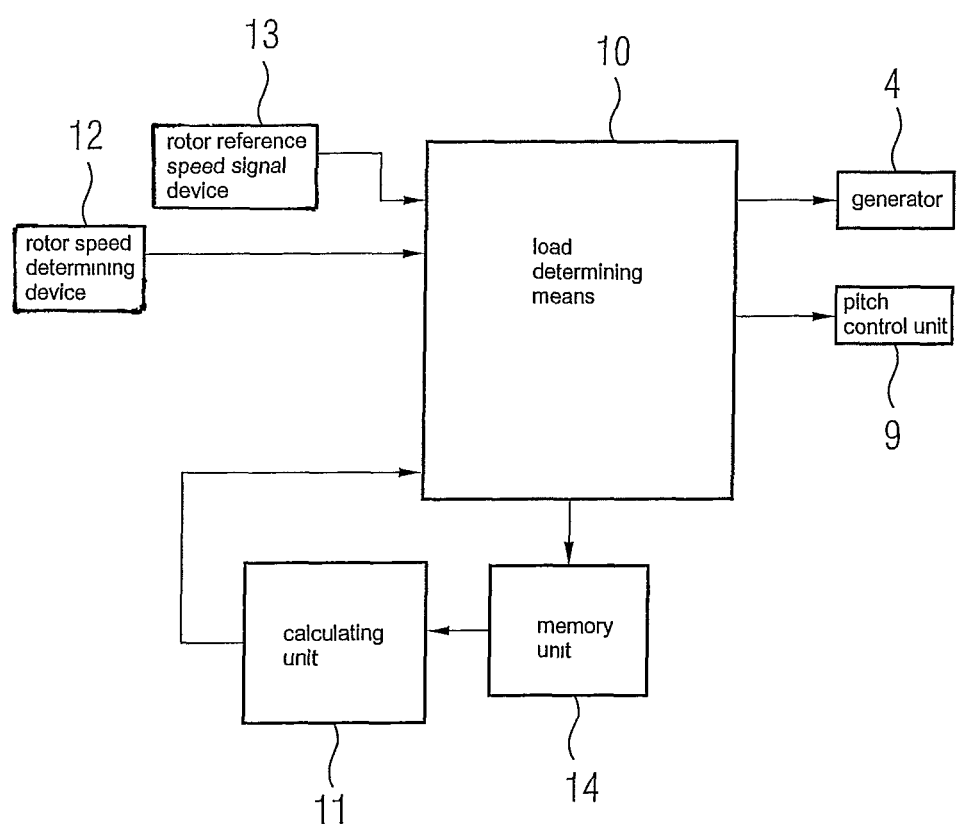
FIG. 2 depicts a schematic load determining means.

The principle of the invention shall be further explained by means of FIG. 2 depicting a schematic load determining means 10. As mentioned above, the load determining means 10 is adapted to calculate and/or measure the pitch activity of the blades 3 of the wind turbine 1. The pitch activity is deemed as a proxy for the blade load. In other words, the blade load is deducable from the pitch activity. The blade load is an important parameter in view of the operation of the wind turbine 1 as overload shall be avoided without the need of stopping or interrupting the operation of the wind turbine 1. Thus, the generator 4 of the wind turbine 1 produces power at all times, only the amount of generated power differs in dependence on the blade load, whereby few power is produced in case of high blade loads and much power is produced in case of normal or low blade loads. Therefore, the generator 4 and/or the rotor speed are controlled in dependence on the blade load.

The essential parameter for calculating the pitch activity, that means for example how often and how fast the pitch-angle of the blades changes, is the pitch reference signal. The pitch activity is calculated in a calculating unit 11 and pitch activity data is subsequently sent to the load determining means 10. Additional quantities like the standard deviation of the pitch reference signal, the average pitch speed and the total pitch movement per time might also be considered for the determination of the pitch activity.

Aside, the load determining means 10 receives and processes input rotor speed signals from a rotor speed determining device 12 and rotor reference speed signals from a rotor reference speed signal device 13.

Further external parameters concerning environmental quantities like wind speed, ambient temperature and/or ambient pressure might be considered as input values for correcting the pitch activity. The same applies to internal parameters like for instance temperature and/or pressure of a hydraulic oil used in the blade pitch adjusting means 7. These parameters may act as a correction means in line with the determination of the pitch activity and thus, the blade load.

Based on these input signals the load determining means 10 generates and outputs a power reference control signal to the power generating unit, that is the generator 4 so as to control, that is perform power generation in dependence on the power reference control signal. Further, the load determining means 10 generates and outputs a pitch reference control signal to the pitch control unit 9, so as to control, that is perform pitching of the blades 3 in dependence on the pitch reference control signal. Thus, rotor speed and power production of the wind turbine 1 are changed by changing the power reference control signal and the pitch reference control signal.

A memory unit 14 is provided for storage of the pitch activity data including pitch reference signal and other relevant pitch activity data determined from or input to the load determining means 10. As is discernable, the stored data may be used in the calculating unit 11 in line with the calculation of the pitch activity.

The invention claimed is:

1. A wind turbine for power generation, comprising:
a power generating unit;
a rotor comprising a plurality of blades;
a blade pitch adjusting device for pitching the blades to control a power output of the wind turbine, said blade pitch adjusting device including hydraulic oil, said hydraulic oil having a determinable temperature and pressure;

a pitch control unit for controlling the blade pitch adjusting device; and a load determining device for determining a blade load from a pitch activity of the blades, wherein the pitch control unit adjusts the pitch-angle of the blades to control the power output of the wind turbine based on the determined blade load derived, at least in part, from the total blade pitch movement per time and either the pressure or the temperature of the hydraulic oil.

2. The wind turbine according to claim 1, wherein the load determining device determines the pitch activity of the blades based on a pitch reference signal.

3. The wind turbine according to claim 2, wherein the load determining device determines the pitch activity of the blades based on a standard deviation of the pitch reference signal.

4. The wind turbine according to claim 1, wherein the load determining device determines the pitch activity of the blades based on an average pitch speed.

5. The wind turbine according to claim 1, wherein for determining the blade load, the load determining device receives and processes input rotor speed signals from a rotor speed determining device, or rotor reference speed signals from a rotor reference speed signal device, or a combination of both.

6. The wind turbine according to claim 1, wherein the determination of the blade load by the load determining device is based on at least one external parameter, or at least one further internal parameter, or combinations thereof.

7. The wind turbine according to claim 6, wherein the external parameter is selected from the group consisting of: a wind speed, an ambient temperature, an ambient pressure and an air density, and wherein the internal parameter is selected from the group consisting of: a temperature of a hydraulic oil of the blade pitch adjusting device, a pressure of the hydraulic oil of the blade pitch adjusting device and a generated power of the wind turbine.

8. The wind turbine according to claim 1,
wherein the load determining device generates a power reference control signal in dependence on the determined pitch activity of the blades, and provides the power reference control signal to the power generating unit, and wherein the power generating unit performs power generation in dependence on the power reference control signal.

9. The wind turbine according to claim 1,
wherein the load determining device provides a pitch reference control signal in dependence on the determined pitch activity of the blades, and provides the pitch reference control signal to the pitch control unit, and wherein the pitch control unit performs pitching of the blades in dependence on the pitch reference control signal.

10. The wind turbine according to claim 1, further comprising a memory unit for storing pitch activity data determined from the load determining device.

11. A method for operating a wind turbine, the wind turbine comprising a power generating unit, a rotor having a plurality of blades, and a blade pitch adjusting device having hydraulic oil, the method comprising:

determining a pitch activity of the blades, determining a blade load from the determined pitch activity, and controlling power generation by the power generating unit in dependence on the determined blade load, and adjusting the pitch-angle of the blades to control the power generation based, at least in part, on the blade load determined from the total blade pitch control movement per time and either a pressure or a temperature of the blade pitch adjusting device hydraulic oil.

12. The method according to claim 11, comprising determining the pitch activity of the blades based on a pitch reference signal, or a standard deviation of the pitch reference signal, or an average pitch speed or combinations thereof.

13. The method according to claim 11, wherein determining the blade load comprises receiving and processing an input rotor speed signal from a rotor speed determining device, or receiving and processing a rotor reference speed signal from a rotor reference speed signal device, or a combination of both.

14. The method according to claim 11, wherein the determination of the blade load is performed taking into account at least one external parameter, or at least one further internal parameter, or a combination of both.

15. The method according to claim 14, wherein the external parameter is selected from the group consisting of: a wind speed, an ambient temperature, an ambient pressure and an air density, and wherein the internal parameter is selected from the group consisting of: a temperature of a hydraulic oil of a blade pitch adjusting device, a pressure of the hydraulic oil of a blade pitch adjusting device and a generated power of the wind turbine.

16. The method according to claim 11, further comprising:
generating a power reference control signal in dependence on the determined pitch activity of the blades; and performing power generation by the power generation unit in dependence on the power reference control signal.

17. The method according to claim 11, further comprising:
generating a pitch reference control signal in dependence on the determined pitch activity of the blades; and performing pitching of the blades in dependence on the pitch reference control signal.

18. The method according to claim 11, further comprising storing data in a memory unit, the data corresponding to the determined pitch activity data in a storage unit.

19. A method for operating a wind turbine, the wind turbine comprising a power generating unit, a rotor having a plurality of blades, and a blade pitch adjusting device having hydraulic oil, the method comprising:

determining a pitch activity of the blades, determining a blade load from the determined pitch activity, controlling a speed of the rotor in dependence on the determined blade load, and adjusting the pitch-angle of the blades to control the speed of the rotor based, at least in part, on the blade load determined from the total blade pitch movement per time and either a pressure or a temperature of the blade pitch adjusting device hydraulic oil.

* * * * *